2,974,148

ANOREXIGENIC PREPARATION AND METHOD OF CURBING THE APPETITE

Leonard Cook, Abington, and Edwin J. Fellows, Glenside, Pa., assignors to Smith Kline & French Laboratories, Philadelphia, Pa., a corporation of Pennsylvania No Drawing. Filed Mar. 30, 1959, Ser. No. 802,635

1 Claim. (Cl. 260—340.5)

This invention relates to *l*-2-amino-1-(3,4-methylenedioxyphenyl)-propane, a medicinal anorexigenic preparation containing *l*-2-amino-1-(3,4-methylenedioxyphenyl)-propane and a method of curbing the appetite in obese human beings.

The medicinal preparation in accordance with this invention contains a compound having the fundamental structural formula of *l*-2-amino-1-(3,4-methylenedioxyphenyl)-propane and is advantageously useful in curbing the appetite. The preparation unexpectedly has a low incidence of side effects in a dosage range where preparations containing related compounds such as amphetamine produce undesirable sympathomimetic side effects such as jitteriness, excessive stimulation or increased tension. Therefore, this preparation has a very favorable therapeutic index as an anorectic when compared with standard agents.

The anorexigenic preparations of this invention more specifically are in a dosage unit form comprising from about 5 mg. to about 75 mg., and preferably from about 8 mg. to about 50 mg., of *l*-2-amino-1-(3,4-methylenedioxyphenyl)-propane or a nontoxic acid addition salt thereof and a nontoxic pharmaceutical carrier. The most advantageous and preferred range is from about 10 to about 15 mg. of *l*-isomer. Exemplary of nontoxic pharmaceutical carriers are lactose, sucrose, magnesium stearate, talc, glyceryl monostearate, hydrogenated caster oil, starch, peanut oil and pectin.

If a sustained release preparation (i.e., having a release of the active constituent over a period of about 12 hours) is used as is preferable, the above dosage unit ranges can be approximately tripled. Such sustained release forms are for example medicated seeds covered with fat-wax coating combined in a hard gelatin capsule, a sustained release tablet with the medicament imbedded in a wax matrix or small spheres of medicament spray dried with delay release material.

A wide variety of pharmaceutical forms can be employed. Thus, if a solid carrier is used, the preparation can be tableted or placed in a hard gelatin capsule with a pharmaceutical filler. If a liquid carrier is used, the preparation may be in the form of a soft gelatin capsule or a liquid sustained release form. Therefore, the pharmaceutical form may be a capsule, a tablet, pill troche, powder or aqueous suspension of a powder each having a definite amount of drug as described for the dosage unit above. The amount of pharmaceutical diluent or carrier in these forms will vary widely but, preferably, will be from about 25 mg. to about 1 gm. per dosage unit.

In accordance with the method of inducing anorexia in humans, particularly obese humans, a dosage regimen of *l*-2-amino-1-(3,4-methylenedioxyphenyl)-propane or one of its nontoxic acid addition salts is administered internally, preferably orally, in an amount sufficient to induce anorexia. Advantageously, the compound combined with a pharmaceutical carrier is administered orally to obese humans in a daily regimen of from about 10 to 250 mg., or preferably about 30 to 75 mg., of the *l*-isomer. Most advantageously, the dosage units described above are administered orally to obese humans from 1 to 5 times daily.

The above described preparation and method are also useful in producing antidepressant activity and can be used to treat depressed psychotic patients.

The novel levo rotatory isomer of 2-amino-1-(3,4-methylenedioxyphenyl)-propane of this invention which has anoretic and antidepressant activity is advantageously prepared by chemical resolution of the racemic mixture obtained either from chemical synthesis or racemization of the *d* base. This resolution is accomplished by forming diastereoisomeric salts of the base with appropriate optically active acid resolving agents at, for example, room temperature followed by fractional crystallization of said salts from appropriate solvent systems employing, advantageously, temperatures in the range of from the boiling point of the solvent system to 0° C.

The racemic base is either isolated as such from its chemical preparation or by neutralizing an acid addition salt, such as the hydrochloride, in aqueous solution with an inorganic base, for example, sodium hydroxide. The desired *dl* base is then isolated by extraction into an aqueous immiscible organic solvent such as ether or benzene. The solvent is removed and the crude basic residue resolved as such or distilled to purity.

Alternatively, the *dl* salt may be reacted directly with the salt, preferably alkali metal, of the optically active resolving agent to form the diastereoisomeric salt.

The resolving acid can be either the *d* or the *l* form. Exemplary of such agents are *d*-camphoric acid, *d*-camphorsulfonic acid, *d*- or *l*-malic acid, $d(+)$-α-bromo-π-sulfonic acid and preferably *d*- or *l*-tartaric acid or *l*-mentholoxyacetic acid. The *l*-menthoxyacetic acid salt of *l*-2-amino-1-(3,4-methylenedioxyphenyl)-propane has been found to have exceptionally favorable solubility characteristics and is especially advantageous. The solvent systems used for fractional crystallization vary with the resolving agent and whether the *d* or *l* form of the base is to be separated initially. For separation of the desired tartrate, either acid or neutral solvent systems of water and aqueous miscible alcoholic solvents are used, particularly isopropanol. The *d*-base-*d*-bitartrate is crystallized most readily from pure water and the desired *l*-base-*l*-bitartrate from 91% isopropanol. Advantageously most of *d* base salt is removed then the *l* base salt purified by fractional crystallization.

The resolving agent is then recovered by neutralization with an inorganic base such as an alkali metal hydroxide or carbonate, for example, sodium hydroxide or carbonate or potassium hydroxide or carbonate which gives the desired *l* base which then can be reacted with a nontoxic acid to form the active ingredient of the composition of this invention. The impure *dl* base residues from the fractional recrystallizations can be reworked through the base. The *d* base or impure mixtures thereof can be racemized to the *dl* mixture, for instance by heating the base in the presence of a nickel catalyst for several hours at elevated temperatures such as from 100° C. to 300° C. to obtain the *dl* mixture for resolution as described above.

Preferably the hydrochloride salt of the *l*-2-amino-1-(3,4-methylenedioxyphenyl)-propane is used in the dosage unit forms of this invention, however, either the base itself or a nontoxic pharmaceutically acceptable organic or inorganic acid addition salt of the base may be used, such as the salt derived from sulfuric, nitric, phosphoric, citric, acetic, lactic, salicyclic, tartaric, ethanedisulfonic, sulfamic, acetylsalicyclic, succinic, fumaric, maleic, hydrobromic, benzoic and like acids. The salts are conveniently prepared by reacting the free base with either a stoichiometric amount or an excess of the desired acid in a suitable solvent as ethanol, ether, ethyl acetate, acetone, water or various combinations of solvents.

The following examples are intended to teach the use of this invention including the isolation of the active isomer, the incorporation of the isomer into dosage unit forms and the method of inducing anorexigenic and antidepressant activity.

Example 1

A mixture of 630 gms. (4.2 moles) of $d$-tartaric acid, 716 gms. 4.0 moles, B.P. 123–5° C./3–5 mm.) of racemic 2-amino-1-(3,4-methylenedioxyphenyl)-propane and 1100 ml. of water is reacted under heat. The hot reaction solution is diluted with 6000 ml. of 99% isopropanol and allowed to cool to 57–60° C. for several hours. The crystals are separated by filtration, rinsed with cold isopropanol and air-dried. Other crops of tartrate are obtained from the mother liquors.

All crops are combined and fractionally crystallized from 91% isopropanol. The purified crystalline produce is $dd$-bitartrate, M.P. 165–166° C., $[\alpha]_D^{25} = +27.3°$ in water.

The mother liquors are evaporated and the solids obtained neutralized to give crude $l$ base, admixed with same $dl$ base, which is reacted with 207 gms. (1.38 moles) of $l$-tartaric acid in 2000 ml. of 91% isopropanol. The solution is heated to boiling and cooled to room temperature to separate crude crystals of $ll$ salt which is fractionally crystallized from 91% isopropanol to give $ll$-bitartrate, M.P. 165–166° C., $[\alpha]_D^{25} = -3.5°$ in water. This $l$ base is liberated by neutralization and converted into the hydrochloride, M.P. 197–198° C., $[\alpha]_D^{25} = 23.9°$ in water.

Using $l$-mentholoxyacetic acid ($l$-menthoxyacetic acid), this salt with the $l$-base is obtained, M.P. 153–154° C., $[\alpha]_D^{25} = -46.75°$ (2% in ethanol).

Example 2

| | Mg. |
|---|---|
| $l$-2-amino-1-(3,4-methylenedioxyphenyl)-propane hydrochloride | 15 |
| Lactose | 240 |
| Starch | 45 |

The above ingredients were thoroughly mixed, granulated using a 10% gelatin solution and compressed into tablets using an admixture of talc-stearic acid as a lubricant. The tablets are administered orally to obese patients three times daily (45 mg.) to induce anorexia.

Example 3

| | Mg. |
|---|---|
| $l$-2-amino-1-(3,4-methylenedioxyphenyl)-propane sulfate | 10 |
| Lactose | 250 |
| Starch | 45 |

The above ingredients were thoroughly mixed, granulated using a 10% gelatin solution and compressed into tablets using an admixture of talc-stearic acid as a lubricant.

Example 4

| | Gm. |
|---|---|
| $l$-2-amino-1-(3,4-methylenedioxyphenyl)-propane hydrochloride | 60 |
| Lactose (200 mesh) | 3060 |
| Magnesium stearate | 60 |

The powders are mixed, screened and filled into #2 hard gelatin capsules (12,000 capsules at 5 mg).

Example 5

| | Mg. |
|---|---|
| $l$-2-amino-1-(3,4-methylenedioxyphenyl)-propane hydrochloride | 20 |
| Peanut oil | 280 |

The ingredients are mixed to a thick slurry and filled into a soft gelatin capsule.

The capsules are administered orally to obese patients twice daily to induce anorexia.

Example 6

| | Mg. |
|---|---|
| $l$-2-amino-1-(3,4-methylenedioxyphenyl)-propane hydrochloride | 30 |
| Hydrogenated castor oil | 170 |

The chemical is imbedded in the hydrogenated castor oil by melting the latter, mixing in the chemical and solidifying. After comminuting and screening through a Number 10 screen, the powder is granulated with a small amount of starch to produce sustained release granules.

These granules can be filled into hard gelatin capsules to give sustained release capsules.

Example 7

| | Mg. |
|---|---|
| $l$-2-amino-1-(3,4-methylenedioxyphenyl)-propane hydrochloride | 15 |
| Stearic acid | 15 |
| Talc | 45 |

The above ingredients are mixed and granulated with a gelatin solution, dried, screened and compressed into cylindrical, flat faced tablets. Sustained release granules prepared as in Example 5 are added to the die and compressed onto the previously formed tablets.

These sustained release tablets are administered to obese patients once daily after rising to induce anorexia.

Example 8

| | Mg. |
|---|---|
| $l$-2-amino-1-(3,4-methylenedioxyphenyl)-propane hydrochloride | 50 |
| Lactose | 200 |
| Magnesium stearate | 50 |

The above ingredients are mixed, granulated and compressed into 50 mg. scored tablets.

This application is a continuation-in-part of application Serial No. 671,720, filed July 15, 1957.

What is claimed is:

Optically active $l$-2-amino-1-(3,4-methylenedioxyphenyl)-propane $l$-menthoxyacetic acid salt.

References Cited in the file of this patent

UNITED STATES PATENTS

| | | |
|---|---|---|
| 2,597,446 | Bruce | May 20, 1952 |
| 2,631,119 | Ferguson | Mar. 10, 1953 |
| 2,647,130 | Kwalter | July 28, 1953 |
| 2,748,052 | Rosner | May 29, 1956 |

OTHER REFERENCES

Mannich et al.: "Ber." 43, p. 193 (1910).
Gunn et al.: "J. Physiol." vol. 95, pp. 485–500 (1939).
Ota: "Bull. Chem. Soc. Japan," vol. 21, pp. 75–77 (1948).